G. S. RICHARDSON.
Fruit-Gatherer.

No. 61,257.  
Patented Jan. 15, 1867.

Witnesses:  
W. H. Burridge  
J. Holmes

Inventor:  
George S. Richardson

AM. PHOTO-LITHO. CO. N.Y. (OSBORNE'S PROCESS.)

United States Patent Office.

GEORGE S. RICHARDSON, OF STOW, OHIO.

*Letters Patent No. 61,257, dated January 15, 1867.*

IMPROVEMENT IN FRUIT PICKERS.

*The Schedule referred to in these Letters Patent and making part of the same.*

TO ALL WHOM IT MAY CONCERN:

Be it known that I, G. S. RICHARDSON, of Stow, in the county of Summit, and State of Ohio, have invented certain new and useful Improvements in Fruit Pickers; and I do hereby declare that the following is a complete description of the construction of the same, reference being had to the accompanying drawings, making a part of this specification, in which—

Like letters of reference refer to like parts in the views.

Figure 1:
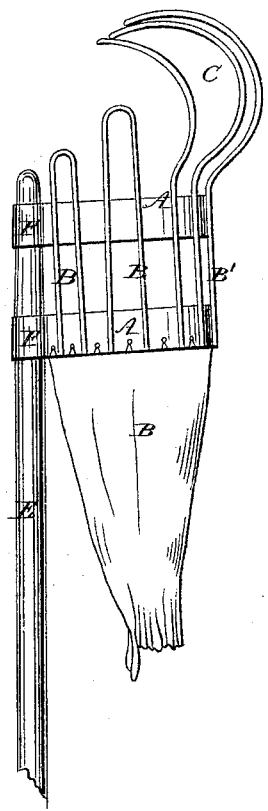
Figure 1 is a side view of the picker.
Figure 2:
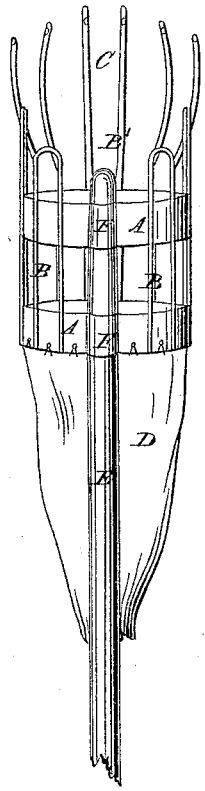
Figure 2 is a front view of the same.

This picker consists of a framework of wire, and is constructed as follows: A is a pair of wide rings or hoops, which may be of brass, iron, or any other material of a suitable character. These rings are connected to each other, in the position shown in the drawing, by the wires B B'. The guard-wires B are of unequal length, being shorter near the front than at the side, the reason of which will be shown hereafter. The wires B' reach above and curve over the sides of the ring towards the front, covering about one-half its diameter. These curved wires or fingers form collectively a claw, C, the fingers of which may be more or less in number, thereby making the distance between them greater or less, according to the size of the fruit to be picked. It will be seen that the several wires, together with the rings or hoops, form a sort of basket of loose open-work, and which can be easily seen through. D is a bag or sleeve attached to the bottom of the basket, and may be in length more or less, as circumstances may require.

The manner of using the picker is as follows: It is fixed to the end of a rod, E, the length of which being according to the height of the fruit from the ground. By inserting the end of the rod into the socket rings F, the upper ring being a little smaller than the lower one, prevents the rod from slipping through, at the same time it holds it securely while in use. The operator, standing upon the ground, reaches up and hooks the claw of the picker around the apple, so that the stem will come between the fingers; the apple is then pulled off, and drops directly into the basket, from thence into the bag of the picker. The guard wires B prevent the fruit from falling off at one side, at the same time they offer no obstruction to the passing of the fruit to the claw; the front wires being made short, as above stated, allow sufficient space for the passing of the largest apple. Small fruits, such as cherries, &c., may be gathered by this implement, as above said, by having the fingers placed closer together. It can also be used for picking nuts, and for which purpose it is equally well adapted. By the use of the bag or sleeve referred to, if made of sufficient length to reach the hand of the person, the fruit can be taken at once from the bag, without the necessity of lowering the picker for that purpose. Hence, by these means, the most delicate fruit can be picked and dropped to the hand without the least danger of bruising by the fall. This implement being made of open wire-work, enables the operator to see the fruit through it, and by this be enabled to grasp the fruit without difficulty.

What I claim as my improvement, and desire to secure by Letters Patent, is—

The guards B, of unequal lengths, and single curved fingers B', connected with the hoops or bands A, in combination with the socket rings F, bag D, and staff or handle, arranged in relation to each other as and for the purpose specified.

GEORGE S. RICHARDSON.

Witnesses:
W. H. BURRIDGE,
I. HOLMES.